US005520600A

United States Patent [19]

Fukumoto

[11] Patent Number: 5,520,600

[45] Date of Patent: May 28, 1996

[54] FIXING ROLLER

[75] Inventor: Yasuhiro Fukumoto, Osaka, Japan

[73] Assignee: Sumitomo Electric Industries, Ltd., Osaka, Japan

[21] Appl. No.: 284,181

[22] Filed: Aug. 2, 1994

[30] Foreign Application Priority Data

Aug. 4, 1993 [JP] Japan .................................... 5-213437

[51] Int. Cl.$^6$ ...................................................... B23P 15/00

[52] U.S. Cl. ................................................................ 492/56

[58] Field of Search ............................... 492/56; 428/346, 428/359, 382, 383, 372, 375, 377

[56] References Cited

U.S. PATENT DOCUMENTS

| | | | |
|---|---|---|---|
| 4,789,565 | 12/1988 | Kon et al. | 427/375 |
| 4,829,931 | 5/1989 | Mogi | 355/289 |
| 4,887,340 | 12/1989 | Kato et al. | 492/56 |
| 5,014,406 | 5/1991 | Kato et al. | 492/56 |
| 5,217,532 | 6/1993 | Sasame et al. | 118/60 |
| 5,253,027 | 10/1993 | Gato | 355/290 |
| 5,376,448 | 12/1994 | Suzuki et al. | 492/56 |
| 5,403,656 | 4/1995 | Takeuchi et al. | 492/56 |
| 5,403,995 | 4/1995 | Kishino et al. | 492/56 |

FOREIGN PATENT DOCUMENTS

| | | |
|---|---|---|
| 0186314 | 7/1986 | European Pat. Off. . |
| 0269262 | 6/1988 | European Pat. Off. . |
| 0302741 | 2/1989 | European Pat. Off. . |
| 0313023 | 4/1989 | European Pat. Off. . |
| 0322127 | 6/1989 | European Pat. Off. . |
| 0469629 | 2/1992 | European Pat. Off. . |

*Primary Examiner*—Irene Cuda
*Attorney, Agent, or Firm*—Cushman Darby & Cushman

[57] ABSTRACT

A fixing roller for use in an electrophotographic apparatus wherein copy paper carrying a toner image formed thereon is passed between a pair of rollers so that the toner image is thermally fixed on the copy paper. The fixing roller includes a roller substrate having a hollow core, an elastic layer made of silicone rubber formed on an outer surface of the roller substrate, a fluororubber layer, and (D) a release layer consisting of fluororesin are provided in this order. An adhesion layer for silicone rubber and fluororubber is provided between the silicone rubber elastic layer and the fluororubber layer.

8 Claims, 1 Drawing Sheet

FIXING ROLLER

BACKGROUND OF THE INVENTION

1. Field of the Invention

The present invention relates to a fixing roller of the general type used in the fixing part of an electrophotographic copier, laser printer, facsimile machine, etc.

2. Description of Related Art

The electrophotographic process generally includes a step in which a light-sensitive body is exposed to an image to form an electrostatic latent image on the light-sensitive body. Then, a colored charged particles toner powder is made to adhere to this electrostatic latent image so as to develop the image. The toner image is then transferred onto a piece of copy paper (sheet-like transfer material or recording material) in an un-fixed state. Finally, the unfixed toner image is fixed onto the copy paper by a method such as heating.

With regard to the fixing method, there are various methods such as heat roller fixing, fixing by the oven method (using the radiated heat of the heater), and pressure fixing. Among these, the most often-used fixing method in recent years is the heat roller fixing method wherein a pair of rollers internally provided with heating sources such as electric heaters and having their outer surfaces coated with rubber or resin of excellent releasability are urged against each other, and copy paper carrying a toner image formed thereon is passed between these rollers so that the toner image is fused onto transfer paper. In this case, a heating source may be provided in only one of the rollers so that the one roller is used as a heat fixing roller, while the other is used as a pressing roller.

Compared to other fixing methods, the heat roller fixing method has a very high thermal efficiency, and is suited to high speed operations, but it has a defect that the life of the heat roller is short.

Ordinarily, a fixing roller is configured so that an elastic layer and a resin layer are provided for purposes of offset prevention on the outer surface of a metallic roller (core) which is formed by metal such as stainless steel or aluminum. Conventionally, as an improved fixing roller, Japanese Patent Post-examination Publication No. Hei-1-24311,for example, proposes a fixing roller with a configuration where the outer surface of the metal roller is coated with an elastic layer consisting of fluororubber or silicone rubber, and, further, a layer consisting of fluororesin on top of this elastic layer. With regard to this fixing roller, not only is it superior in terms of the non-stickiness of the surface, but also abrasion or injury of the fluororesin layer is inhibited in the case where a paper guide contacts the rotating rollers, since the elastic layer is deformed via the thinly coated fluororesin layer, and since the fluororesin layer is also deformed along this elastic material.

Yet, with regard to the conventional fixing roller, peeling tends to occur between the elastic layer and the fluororesin layer with prolonged use, and durability is inadequate. In particular, since the combination of an elastic layer consisting of silicone rubber and a release layer consisting of fluororesin exhibits poor adhesiveness between the two, surface peeling easily occurs.

With regard to a fixing roller where a resin layer is formed on top of an elastic layer, a proposal is made in Japanese Patent Unexamined Publication No. Hei-1-147576according to which several holes are formed in the surface of the elastic layer which constitutes the boundary of the elastic layer and resin layer, and the resin layer is secured by an anchor effect due to the entry of the resin material into the pertinent holes. With regard to this method, a layer of silicone rubber mixed with quartz powder, for example, is provided on the outer surface of the metal roller and is vulcanized and molded, after which the quartz powder projecting from the elastic layer surface is removed by abrasive cloth and numerous holes are formed; a fluororesin layer is subsequently provided on top of this. Yet, since the silicone rubber forming the elastic layer and the fluororesin forming the resin layer have good mutual separability, the adhesive strength is weak, and with this type of physical retention means alone, there is danger of peeling at the junction part during use, and durability is still inadequate.

SUMMARY OF THE INVENTION

The present invention provides a fixing roller that has good releasability and fixability characteristics, is abrasion resistant, and which has superior durability.

The fixing roller according to the present invention overcomes the problem of interlayer peeling between an elastic layer consisting of silicone rubber formed on a roller substrate made from metallic or ceramic material, and a fluororesin layer formed on top of the elastic layer, and is thus able to be stably used over a long period of time.

As a result of diligent research aimed at overcoming the problems associated with the conventional arrangement of a fixing roller which has an elastic layer consisting of silicone rubber on a roller substrate and a release layer consisting of fluororesin. According to the present invention, the basic configuration of the fixing roller is changed. There is provided on an outer surface of a roller substrate a silicone rubber elastic layer. A fluororubber layer is provided over the silicone rubber elastic layer, and a release layer of a fluororesin, is formed over fluororubber layer. The fluororubber layer has the effect of bringing about adhesion between the silicone rubber elastic layer and the fluororesin release layer. To further inhibit interlayer peeling, an adhesive layer for the adhesion of the silicone rubber and fluororubber can be optionally provided between the silicone rubber elastic layer and the fluororubber layer.

Since the fixing roller of the present invention includes an elastic layer on the outer surface of the roller substrate and a fluororesin layer with superior releasability and abrasion resistance on the outermost surface, and since there is good peel strength between the both layers, the fixing roller has superior releasability, abrasion resistance, fixability, and durability.

Thus, according to the present invention, provided is a fixing roller for use in an apparatus wherein copy paper carrying a toner image formed thereon is passed between a pair of rollers so that the toner image is thermally fixed on the copy paper. In its most basic arrangement, the fixing roller according to the present invention includes the following:

(A) a roller substrate having an outer surface;

(B) a silicone rubber elastic layer;

(C) a fluororubber layer; and (D) a release layer made of fluororesin, provided in the order set forth above.

As an alternative preferred embodiment, there can be additionally provided (E) an adhesion layer for silicone rubber and fluororubber. This layer is provided between (B) the elastic layer made of silicone rubber and (C) the fluororubber layer.

DETAILED DESCRIPTION OF THE PREFERRED EMBODIMENTS

Figure 1:
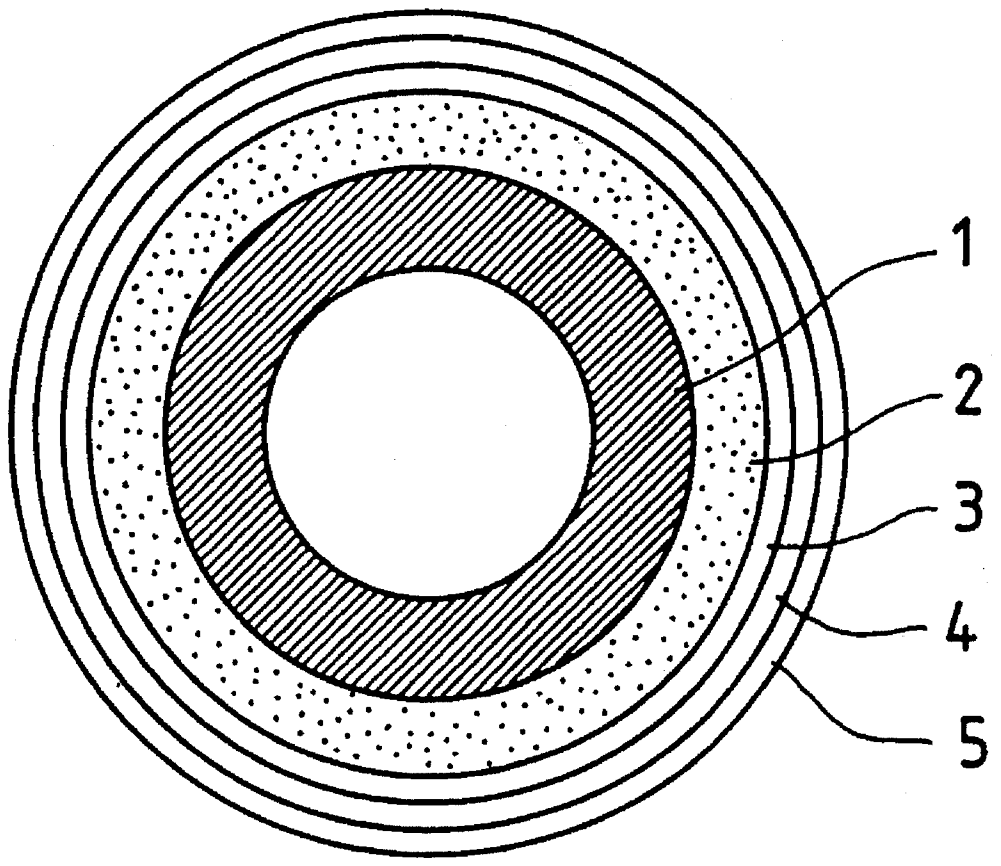
FIG. 1 (the only figure) is a cross sectional view of a fixing roller of the present invention.

The fixing roller of the present invention will be explained in greater detail with reference to FIG. 1 (the only figure), which is a cross-sectional view of the presently preferred embodiment of the invention.

The central portion of the fixing roller according to the invention is constituted by a roller substrate 1 made from a metallic or ceramic material. The substrate has a hollow core so that a heater can be inserted therein. On the outer surface of substrate 1 is formed an elastic layer 2 which is made of silicone rubber. An adhesion layer 3 for silicone rubber and fluororubber is formed over elastic layer 2. A fluororubber layer 4 is formed over adhesion layer 3. A release layer 5 made of fluororesin is provided over fluororubber layer 4. When the roller is used as a fixing roller, a heater, such as an electric heater is provided in the hollow interior of the roller substrate.

As the material of the roller substrate (core), metal with good heat conduction such as aluminum or stainless steel, or ceramic material is used.

With regard to the elastic layer which is formed on the outer surface of the roller substrate, since it is necessary to withstand the high temperature conditions during use as a fixing roller, silicone rubber is used as the elastic material to form the elastic layer.

As the silicone rubber, general-purpose materials may be used, and examples thereof may includes methyl silicone rubber, vinylmethyl silicone rubber, phenylmethyl silicone rubber, fluorosilicone rubber, etc.

For purposes of (1) adjustment of heat conductivity, (2) adjustment of mechanical properties such as tensile strength and tear strength, and (3) adjustment of impact resilience, fillers may be blended into this silicone rubber in a suitable manner. By having the silicone rubber layer contain fillers, it is possible to improve fixability and offset prevention.

As inorganic fillers, examples thereof may include carbon black, talc, mica, kaolin, titanium oxide, iron oxide, chromium oxide, calcium carbonate, calcium silicate, calcium sulfate, barium sulfate, magnesium carbonate, magnesium phosphate, graphite, silicon nitride, boron nitride, titanium nitride, molybdenum disulfide, hadrotalcite, metallic powder, etc. As organic fillers, examples thereof may include natural resins and synthetic resins such as polyimide, polyamideimide, and polyether sulfone. These fillers may be used alone or in a combination of 2 or more, and are usually used in a proportion of 5 to 100 parts by weight per 100 parts by weight of silicone rubber.

When the outer surface of the roller substrate undergoes in advance surface roughening by sand blasting, and/or undergoes the application of an adhesive, particularly an adhesive having heat resistance, this is extremely effective in improving durability due to the improvement in adhesiveness with the silicone rubber layer. Specifically, for example, it is preferable to apply in advance a heat-resistant type of metal primer onto the outer surface of a metallic roller substrate, and to provide an elastic layer consisting of silicone rubber on top of this.

The thickness of the elastic layer consisting of silicone rubber can be set desirably according to the desired impact resilience and heat conductivity, and is usually in a range of from 0.1 to 1 mm, and preferably in a range of from 0.10 to 0.5 mm.

In the present invention, an adhesive layer consisting of a specified material is provided between the elastic layer and the release layer. As the material forming the adhesive layer, fluororubber is used. When an adhesive layer for the silicone rubber and fluororubber is further provided between the elastic layer consisting of silicone rubber and the fluororubber layer, the adhesive effect is further improved.

As the fluororubber, examples thereof may include vinylidene fluoride rubber, tetrafluoroethylene-propylene rubber, tetrafluoroethylene-perfluoromethyl vinyl ether rubber, phosphagen fluororubber, fluoropolyether, etc. These fluororubbers may be used alone or in a combination of 2 or more, and when small quantities of fluororesin (generally, in a proportion of less than 30 weight %) such as tetrafluoroethylene resin (PTFE), tetrafluoroethylene-perfluoroalkylvinylether copolymer (PFA), and tetrafluoroethylene-hexafluoropropylene copolymer (FEP) are added to the fluororubber, the adhesive strength with the release layer consisting of fluororesin is improved.

The thickness of the fluororubber layer is usually selected to be in a range of form 0.1 to 50 μm, preferably from 0.5 to 20 μm, and more preferably from 1 to 10 μm. Within this range, the fluororubber layer functions satisfactorily as an adhesive layer.

As an adhesive agent for the silicone rubber and fluororubber, an example thereof is GLP-103SR manufactured by Daikin Kogyo Co., Ltd. The thickness of the adhesive layer for the silicone rubber and fluororubber is usually selected to be in a range of from 0.1 to 10 μm, and preferably from 0.5 to 5 μm. Within this range, the adhesive agent functions satisfactorily as an adhesive layer.

As the fluororesin which is used in the release layer, in order to enable the continuous use of the fixing roller at high temperatures of about 200° C., it is preferable to use a substance which is particularly heat resistant, for example, tetrafluoroethylene resin (PTFE), tetrafluoroethylene-perfluoroalkylvinylether copolymer (PFA), or tetrafluoroethylene-hexafluoropropylene copolymer (FEP). To the extent that releasability and heat resistance are not impaired, fillers and other resins may be blended into the fluororesin as desired.

The thickness of the release layer is usually selected to be in a range of from 0.1 to 50 μm, and preferably from 5 to 30 μm. When this thickness is too small, the release layer on the surface is worn away by prolonged use, and the adhesive layer or elastic layer is exposed, with a resultant decline in non-stickiness.

With regard to the method for manufacture of the fixing roller of the present invention, (1) usually, after the outer surface of the metal roller has undergone surface roughening by sand blasting, and a heat resistant adhesive agent has been applied to it in the desired manner, (2) silicone rubber is then coated onto it, vulcanized (cured), and molded into the required form in the desired manner (for example, it is ground into a reverse crown shape), after which (3) fluororubber is directly applied, or an adhesive layer for the silicone rubber and fluororubber is applied followed by application of the fluororubber, and vulcanization is performed by heating. In this case, since vulcanization is completed simultaneously with the baking of the subsequent release layer, one can choose at one's discretion to stop it in the middle or not to conduct it at this stage. Furthermore, (4) a dispersion solution of unsintered fluororesin is applied onto the fluororubber layer, after which heating and sintering (baking) are performed.

A fixing roller constructed in accordance with the present invention is able to withstand a continuous number of fixing paper sheets of 500,000 sheets without any interlayer peeling. This is because the various layers including (B) an elastic layer consisting of silicone rubber, (C) a fluororubber layer, and (D) a release layer formed by fluororesin or the various layers including (B) an elastic layer consisting of silicone rubber, (E) an adhesive layer for the silicone rubber and fluororubber, (C) a fluororubber layer, and (D) a release layer formed by fluororesin have excellent adhesiveness with the respective contact layer(s).

Below, the present invention is specifically explained with reference to examples and a comparative example, but the present invention is not limited to these examples.

EXAMPLE 1

The substrate is an aluminum core with an outer diameter of 50 mm. The outer surface of the core was subjected to surface roughening by sand blasting. Then a heat-resistant type of metal primer was applied, and baked for 10 minutes at 150° C.

An elastic layer of silicone rubber (methyl silicone rubber manufactured by Shin-etsu Chemical Industry Co., Ltd.) was formed on top of the primer after baking. After vulcanization (curing), the elastic layer was ground into a reverse crown shape of 125 μm by means of a cylindrical grinding machine until the thickness became 200 μm.

On top of the silicone rubber elastic layer, an adhesive agent for silicone rubber and fluororubber (GLP-103SR manufactured by Daikin Kogyo Co., Ltd.) was applied to a thickness of 2 μm, and was dried for 10 minutes at 70° C. Next, on top of this, fluororubber (GLS-213 manufactured by Daikin Kogyo Co., Ltd.) was applied to a thickness of 7 μm, and was vulcanized for 30 minutes at 200° C. C.

Finally, PTFE dispersion (E-4300CRN manufactured by Daikin Kogyo Co., Ltd.) was applied to a thickness of 15 μm, and was baked at 350° C. Thereafter, the outer surface was polished with abrasive film.

EXAMPLE 2

The substrate is an aluminum core with an outer diameter of 50 mm. The outer surface was roughened by sand blasting, and a heat-resistant type of metal primer was applied, and baked for 10 minutes at 150° C. On top of this, an elastic layer of silicone rubber (methyl silicone rubber manufactured by Shin- etsu Chemical Industry Co., Ltd.) was formed and vulcanized (cured), after which it was ground into a reverse crown shape of 125 μm with a cylindrical grinding machine until the thickness became 200 μm.

Next, on top of the silicone rubber elastic layer, fluororubber (GLS-213 manufactured by Daikin Kogyo Co., Ltd.) was applied to a thickness of 7 μm, and was vulcanized for 30 minutes at 200° C.

Finally, PTFE dispersion (EK-4300CRN manufactured by Daikin Kogyo Co., Ltd.) was applied to a thickness of 15 μm, and was baked at 350° C. The outer surface was then polished with abrasive film.

Comparative Example 1

The surface of an aluminum core with an outer diameter of 50 mm was subjected to surface roughening by sand blasting, and a heat-resistant type of metal primer was applied, and baked for 10 minutes at 150° C.

On top of this, an elastic layer consisting of silicone rubber was formed, and was ground into a reverse crown shape of 125 μm by a cylindrical grinding machine until the thickness became 200 μm.

Next, on top of the silicone rubber elastic layer, PTFE dispersion (EK-4300CRN manufactured by Daikin Kogyo Co., Ltd.) was applied to a thickness of 15 μm, and was baked at 350° C. Thereafter, the outer surface was polished with an abrasive film.

The peel strength of the elastic layer and fluororesin layer (release layer) of these rollers was measured, and durability tests were also conducted where these rollers were set in the fixing part of a copying machine, and paper was continuously passed through at a roller surface temperature of approximately 180° C. The results are shown in Table 1.

TABLE 1

| | Embodiment 1 | Embodiment 2 | Comparative Example 1 |
|---|---|---|---|
| peel strength of coated fluoro-resin and elastic material (g/cm) | 1200 or more (cohesive failure of silicone rubber) | 150 | 80 |
| Number of sheets withstood as a result of continuous paper passage, and appearance | 500,000 sheets no abnormality | 500,000 sheets no abnormality | 100,000 sheets peeling of coated fluororesin |

Method for measuring peel strength

An 1 cm wide incision was cut in the surface of the fixing roller until the elastic layer was reached, part of the release layer and adhesive layer (in the case of no adhesive layer, the release layer only) was ripped, a tension gauge was attached to this part, and the strength was measured when peeling was conducted circumferentially at 90° C.

As is clear from Table 1, the fixing rollers (Examples 1 and 2) of the present invention exhibit no abnormalities such as interlayer peeling even when the continuous paper passage of 500,000 sheets occurs, and they are superior durability. In the case (Example 1) where an adhesive layer for the silicone rubber and fluororubber is further provided between the elastic layer consisting of silicone rubber and the fluororubber layer, the adhesiveness between the elastic layer consisting of silicone rubber and the release layer consisting of fluororesin is excellent, and durability is particularly superior.

According to the present invention, there is provided a fixing roller which has excellent releasability, abrasion resistance, and fixability, and which is particularly superior in durability. With regard to the fixing roller of the present invention, the adhesiveness between the elastic layer consisting of silicone rubber and the release layer consisting of the outermost layer of fluororesin is excellent, with the result that interlayer peeling due to use at high temperature is inhibited, and stable use over a long period is possible. Since the fixing roller of the present invention has a release layer of fluororesin, the phenomenon of offset does not occur, and since it has an elastic layer at the lower layer, it has superior abrasion resistance.

The fixing roller of the present invention is effective when used in the fixing part of electrophotographic copiers, laser printers, and facsimile machines. In addition, it can be widely used as a pressure roller, or as an elastic fixing roller requiring heat resistance and releasability.

I claim:

1. A fixing roller for use in an apparatus wherein copy paper carrying a toner image formed thereon is passed between a pair of rollers so that the toner image is thermally fixed on the copy paper, comprising:

a roller substrate having an outer surface;

an elastic layer made of silicone rubber, formed on the outer surface of the roller substrate;

a fluororubber layer formed on the elastic layer; and a release layer made of fluororesin formed on the fluororubber layer.

2. A fixing roller according to claim 1 further comprising an adhesion layer for silicone rubber and fluororubber provided between said elastic layer of silicone rubber and said fluororubber layer.

3. A fixing roller according to claim 1 wherein the substrate has a hollow core.

4. A fixing roller according to claim 1 wherein the substrate is made of metal.

5. A fixing roller according to claim 1 wherein the substrate is made of ceramic.

6. A fixing roller according to claim 1 wherein the silicone rubber elastic layer includes a filler blended therein to adjust heat conductivity, mechanical properties such as tensile strength and tear strength, and adjust impact resilience.

7. A fixing roller according to claim 1 wherein the roller substrate is made of a metal and wherein the fixing roller further comprises a heat-resistant metal primer formed on the outer surface of the roller substrate.

8. A fixing roller according to claim 1 wherein the thickness of the elastic layer is in the range of from 0.1 to 1 mm, and preferably in a range of from 0.10 to 0.5 mm.

* * * * *